United States Patent
Bhogal et al.

(10) Patent No.: US 11,010,826 B2
(45) Date of Patent: May 18, 2021

(54) SYSTEM AND METHOD FOR PRIORITIZATION OF RENDERING POLICIES IN VIRTUAL ENVIRONMENTS

(71) Applicant: INTERNATIONAL BUSINESS MACHINES CORPORATION, Armonk, NY (US)

(72) Inventors: Kulvir S. Bhogal, Fort Worth, TX (US); Rick A. Hamilton, II, Charlottesville, VA (US); Brian M. O'Connell, Wake, NC (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 162 days.

(21) Appl. No.: 15/989,788

(22) Filed: May 25, 2018

(65) Prior Publication Data

US 2018/0276742 A1    Sep. 27, 2018

Related U.S. Application Data

(63) Continuation of application No. 12/178,896, filed on Jul. 24, 2008, now Pat. No. 10,037,565.

(51) Int. Cl.
  *G06Q 30/08*     (2012.01)
  *G06Q 30/02*     (2012.01)
  *G06Q 30/06*     (2012.01)

(52) U.S. Cl.
  CPC ............. *G06Q 30/08* (2013.01); *G06Q 30/02* (2013.01); *G06Q 30/0269* (2013.01); *G06Q 30/0601* (2013.01)

(58) Field of Classification Search
  CPC .... G06Q 30/08; G06Q 30/02; G06Q 30/0269; G06Q 30/0601
  USPC ...................................... 705/14.66
  See application file for complete search history.

(56) References Cited

U.S. PATENT DOCUMENTS

| | | | |
|---|---|---|---|
| 6,036,601 A | 3/2000 | Heckel | |
| 6,070,149 A | 5/2000 | Tavor et al. | |
| 6,118,456 A | 9/2000 | Cooper | |
| 6,219,045 B1 * | 4/2001 | Leahy | G06F 3/04815 |
| | | | 715/757 |
| 6,256,043 B1 | 7/2001 | Aho et al. | |
| 6,329,986 B1 * | 12/2001 | Cheng | G06F 3/011 |
| | | | 345/419 |
| 6,396,509 B1 | 5/2002 | Cheng | |
| 6,738,065 B1 | 5/2004 | Even-Zohar | |
| 6,801,930 B1 | 10/2004 | Dionne et al. | |
| 6,845,486 B2 | 1/2005 | Yamada et al. | |
| 6,928,414 B1 | 8/2005 | Kim | |
| 6,954,728 B1 | 10/2005 | Kusumoto et al. | |

(Continued)

*Primary Examiner* — Mario C. Iosif
(74) *Attorney, Agent, or Firm* — Brian Restauro; Andrew M. Calderon; Roberts Calderon Safran & Cole, P.C.

(57) ABSTRACT

A system and method implemented in a computer infrastructure having computer executable code, includes receiving one or more bids for at least one of an enhanced rendering quality and an enhanced rendering order of an object in a virtual universe (VU) and performing a bid resolution for the received one or more bids. Additionally, the method includes rendering one or more objects in the VU with the at least one of the enhanced rendering quality and the enhanced rendering order based on the bid resolution.

20 Claims, 5 Drawing Sheets

(56) References Cited

U.S. PATENT DOCUMENTS

| | | |
|---|---|---|
| 6,968,315 B1 | 11/2005 | Nakisa |
| 6,981,220 B2 | 12/2005 | Matsuda |
| 7,054,831 B2 | 5/2006 | Koening |
| 7,076,445 B1 | 7/2006 | Cartwright |
| 7,184,047 B1 | 2/2007 | Crampton |
| 7,210,104 B2 | 4/2007 | Nakagawa et al. |
| 2001/0020955 A1 | 9/2001 | Nakagawa et al. |
| 2002/0040327 A1 | 4/2002 | Owa |
| 2002/0138607 A1 | 9/2002 | O'Rourke et al. |
| 2003/0005439 A1 | 1/2003 | Rovira |
| 2003/0033292 A1 | 2/2003 | Meisel et al. |
| 2003/0126035 A1 | 7/2003 | Kake et al. |
| 2004/0030741 A1 | 2/2004 | Wolton et al. |
| 2004/0064351 A1 | 4/2004 | Mikurak |
| 2004/0143495 A1 | 7/2004 | Koenig |
| 2004/0148221 A1 | 7/2004 | Chu |
| 2004/0162757 A1 | 8/2004 | Pisaris-Henderson et al. |
| 2004/0162759 A1 | 8/2004 | Willis |
| 2004/0193441 A1 | 9/2004 | Altieri |
| 2005/0022139 A1 | 1/2005 | Gettman et al. |
| 2005/0030309 A1 | 2/2005 | Gettman et al. |
| 2005/0086605 A1 | 4/2005 | Ferrer et al. |
| 2005/0086612 A1 | 4/2005 | Gettman et al. |
| 2006/0015904 A1 | 1/2006 | Marcus |
| 2006/0111979 A1 | 5/2006 | Chu |
| 2006/0143095 A1 | 6/2006 | Sandus et al. |
| 2006/0178968 A1 | 8/2006 | Jung et al. |
| 2006/0178975 A1 | 8/2006 | Jung et al. |
| 2006/0230141 A1 | 10/2006 | Willis |
| 2006/0287105 A1 | 12/2006 | Willis |
| 2007/0061202 A1 | 3/2007 | Ellis et al. |
| 2007/0061204 A1 | 3/2007 | Ellis et al. |
| 2007/0101276 A1 | 5/2007 | Yuen |
| 2007/0118394 A1 | 5/2007 | Cahoon |
| 2007/0118420 A1 | 5/2007 | Jung et al. |
| 2007/0129148 A1 | 6/2007 | Van Luchene |
| 2007/0156509 A1 | 7/2007 | Jung et al. |
| 2008/0306817 A1* | 12/2008 | Amidon ............... G06Q 30/02 705/14.61 |
| 2009/0113066 A1* | 4/2009 | Van Wie ............... H04L 65/605 709/231 |
| 2009/0138817 A1 | 5/2009 | Oron et al. |

* cited by examiner

| Company | Rendering Order Bid | Rendering Quality Bid | Object UUID |
|---|---|---|---|
| ABC | $1.00 | $3.00 | U7655889997 |
| DEF | $1.01 | $1.29 | U7639089900 |
| GHI | $1.25 | $0 | U8765446828 |
| JKL | $1.50 | $0 | U4567876567 |
| MNO | $1.28 | $1.50 | U4342443421 |
| PQR | $4.30 | $1.01 | U9765828827 |
| STU | $5.00 | $5.00 | U9718374894 |

Figure 3

| Company | Rendering Order Bid | Rendering Quality Bid | Object UUID |
|---|---|---|---|
| STU | $5.00 | $5.00 | U9718374894 |
| PQR | $4.30 | $1.01 | U9765828827 |
| JKL | $1.50 | $0 | U4567876567 |
| MNO | $1.28 | $1.50 | U4342443421 |
| GHI | $1.25 | $0 | U8765446828 |
| DEF | $1.01 | $1.29 | U7639089900 |
| ABC | $1.00 | $3.00 | U7655889997 |

SYSTEM AND METHOD FOR PRIORITIZATION OF RENDERING POLICIES IN VIRTUAL ENVIRONMENTS

FIELD OF THE INVENTION

The present invention generally relates to computer-based virtual universes, and more specifically, to a method and system which enables entities, e.g., advertisers, to bid for rendering order enhancements and rendering quality enhancements of objects within a region of a virtual universe.

BACKGROUND OF THE INVENTION

Virtual universes (VUs) are rapidly becoming a popular part of today's culture. A VU is a computer-based simulated environment. Many VUs are represented using 3-D graphics and landscapes, and are populated by many thousands of users, known as "residents". Often, the VU resembles the real world such as in terms of physics, houses, and landscapes.

VUs are also known as metaverses and "3D Internet." Some example VUs include: SECOND LIFE™, ENTROPIA UNIVERSE®, THE SIMS ONLINE™ and THERE™—as well as massively multiplayer online games such as EVERQUEST®, ULTIMA ONLINE™, LINEAGE® and WORLD OF WARCRAFT®. (SECOND LIFE is a trademark of Linden Research, Inc. in the United States and/or other countries. ENTROPIA UNIVERSE is a registered trademark of MindArk PE AB in the United States, other countries, or both. THE SIMS ONLINE and ULTIMA ONLINE are trademarks of Electronic Arts, Inc. in the United States, other countries, or both. THERE is a trademark of Makena Technologies, Inc. in the United States, other countries, or both. EVERQUEST is a registered trademark of Sony Corporation of America, Inc. in the United States, other countries, or both. LINEAGE is a registered trademark of NCsoft Corporation in the United States, other countries, or both. WORLD OF WARCRAFT is a registered trademark of Blizzard Entertainment, Inc. in the United States, other countries, or both.)

A VU is intended for its residents to traverse, inhabit, and interact through the use of avatars. In operation, user(s) control the avatar(s). An avatar is a graphical representation of the user, often taking the form of a cartoon-like human or other figure. The user's account, upon which the user can build an avatar, is tied to the inventory of assets the user owns. A region is a virtual area of land within the VU, typically residing on a server. Assets, avatar(s), the environment, and everything else visually represented in the VU each comprise universally unique identifiers (UUIDs) (tied to geometric data distributed to user(s) as textual coordinates), textures (distributed to user(s) as graphics files), and effects data (rendered by the user's client according to the user's preference(s) and user's device capabilities).

On-line virtual universes or environments present a tremendous new outlet for both structured and unstructured virtual collaboration, gaming and exploration, as well as real-life simulations in virtual spaces. These activities, along with yet to be disclosed new dimensions, in turn, provide a wide open arena for creative and new advertising methods and mechanisms. Immersive virtual universes, among other things, are an avenue to expose potential consumers to a company's advertising. One form of virtual universe advertising includes the display of billboards that are rendered on the client's screen. With the astounding and continual increase in the number of users of virtual worlds, companies are taking more interest in reaching out to virtual world residents through advertising.

SUMMARY OF THE INVENTION

In a first aspect of the invention, a method implemented in a computer infrastructure having computer executable code, comprises receiving one or more bids for at least one of an enhanced rendering quality and an enhanced rendering order of one or more objects in a virtual universe (VU) and performing a bid resolution for the received one or more bids. Additionally, the method comprises rendering one or more objects in the VU with the at least one of the enhanced rendering quality and the enhanced rendering order based on the bid resolution.

In another aspect of the invention, a system comprises a bid placement tool configured to receive one or more bids for at least one of an enhanced rendering quality and an enhanced rendering order of one or more objects in a virtual universe (VU) and a remuneration/billing tool configured to determine a cost to one or more advertisers for the at least one of the enhanced rendering quality and the enhanced rendering order for the one or more objects. Additionally, the system comprises at least one of a bid resolution tool configured to determine the at least one of the enhanced rendering quality and the enhanced rendering order for one or more objects, an object definition tool configured to modify the one or more objects' object definition to indicate the at least one of the enhanced rendering quality and the enhanced rendering order for the one or more objects and an enhanced rendering tool configured to render the one or more objects in the VU with the at least one of the enhanced rendering quality and the enhanced rendering order.

In an additional aspect of the invention, a computer program product comprising a computer usable medium having readable program code embodied in the medium is provided. The computer program product includes at least one component to receive one or more bids for at least one of an enhanced rendering quality and an enhanced rendering order of one or more objects in a virtual universe (VU) and determine the at least one of the enhanced rendering quality and the enhanced rendering order for the one or more objects. Additionally, the at least one component is configured to modify the one or more objects' object definition to indicate the at least one of the enhanced rendering quality and the enhanced rendering order for the one or more objects and render the one or more objects in the VU with the at least one of the enhanced rendering quality and the enhanced rendering order. Furthermore, the at least one component is configured to determine a cost to one or more requestors for the at least one of the enhanced rendering quality and the enhanced rendering order for the one or more objects.

In a further aspect of the invention, a method comprises providing a computer infrastructure operable to receive one or more bids for at least one of an enhanced rendering quality and an enhanced rendering order of an object in a virtual universe (VU), perform a bid resolution for the received one or more bids, and render one or more objects in the VU with the at least one of the enhanced rendering quality and the enhanced rendering order based on the bid resolution.

BRIEF DESCRIPTION OF THE DRAWINGS

The present invention is described in the detailed description which follows, in reference to the noted plurality of drawings by way of non-limiting examples of exemplary embodiments of the present invention.

FIG. 1 shows an illustrative environment for implementing the steps in accordance with the invention;

FIGS. 3 and 4 show exemplary tables of bids according to the invention; and

DETAILED DESCRIPTION OF EMBODIMENTS OF THE INVENTION

The invention is directed to a method and system for advertising in a virtual universe, and more specifically, to a method and system which enables entities, e.g., advertisers, to bid for rendering order enhancements and rendering quality enhancements of objects within a region of a virtual universe.

Presently virtual universes do not use bidding to determine the rendering order or rendering quality of objects within a region. VU clients render the virtual world as described by VU servers. VU servers (or the VU owner or operator) determine the placement of advertisements based upon, e.g., static corporate agreements. In the current art, no methods or systems exist to enable users and organizations to bid for rendering order enhancements or rendering quality enhancements for an object in a VU. By implementing the present invention, though, a VU owner and/or operator may create new revenue streams for advertising within VUs.

According to an aspect of the invention, entities, e.g., advertisers, are able to bid for enhanced rendering order rights for a virtual universe region. Advertisers may opt to pay for a higher rendering order to draw more attention to their advertisements within a virtual universe. Additionally, the invention enables advertisers to bid for enhanced rendering quality of their advertisements within the virtual universe. Users may be more likely to pay attention to advertisements having a higher rendering quality than advertisements having a lower quality rendering.

By implementing the present invention, an advertiser may increase the efficacy of their advertising campaigns (utilizing virtual billboards, for example). Rendering an item first and/or with enhanced quality will, usually, draw the user's attention to that item, enabling more effective advertising. Rendering an advertisement in a VU with enhanced rendering quality may be thought of as similar to a flashing or attracting billboard in the real world, in that the flashing or attracting billboard may be likely to catch a viewer's eye more quickly and/or for a longer period of time than a non-flashing billboard.

In addition, implementing the present invention allows for more affordable advertising. That is, bidding (as opposed to, e.g., static corporate agreements) will help advertisers purchase as much advertising as they can afford. For example, some advertisers can bid what they can afford and receive increased quality and rendering order, while other advertisers can bid more for greater rendering quality and earlier rendering order. Thus, an advertiser is able to spend as much as can be afforded on an advertisement, while still receiving some enhancements.

System Environment

Figure 1:
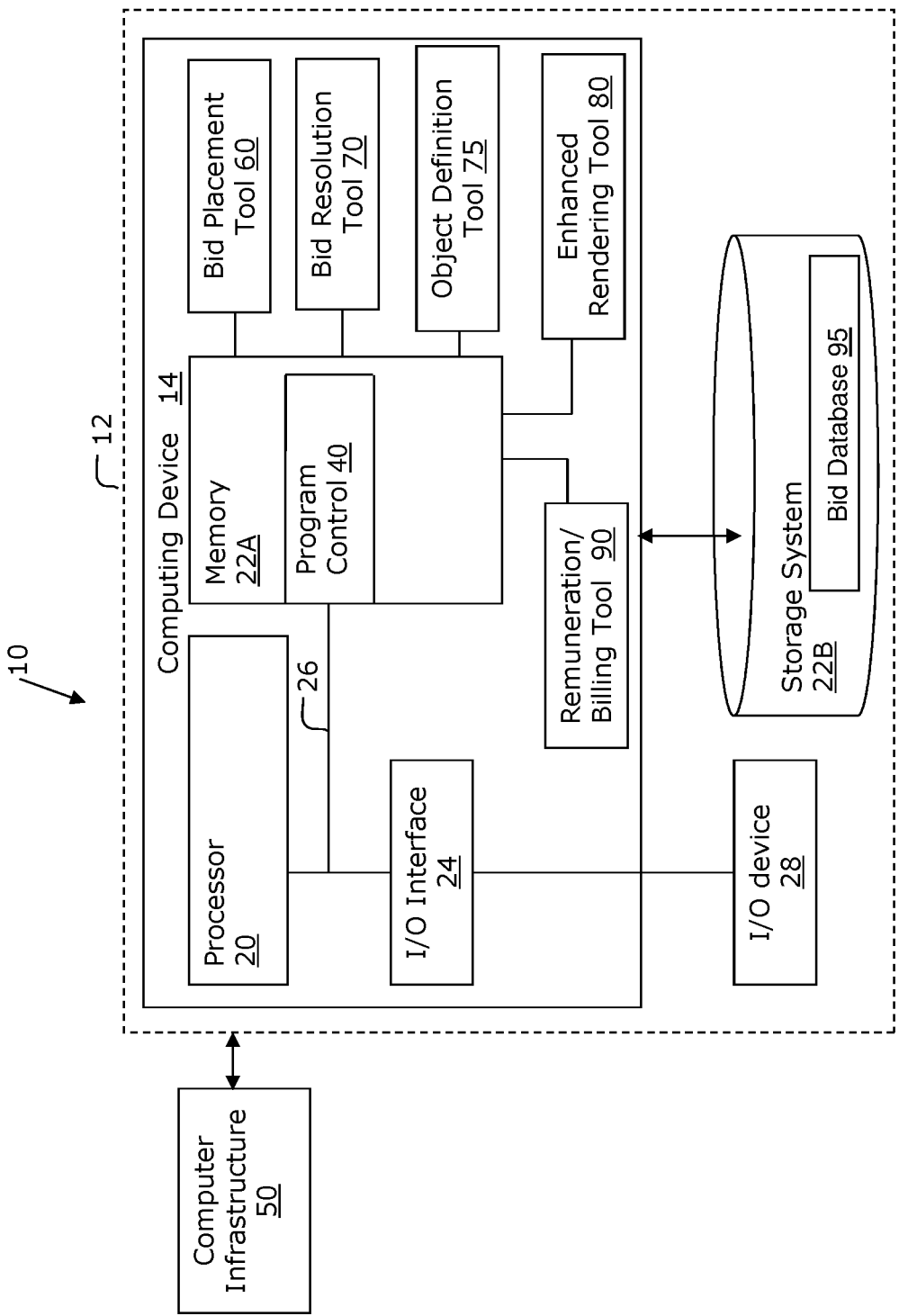

FIG. 1 shows an illustrative environment 10 for managing the processes in accordance with the invention. To this extent, the environment 10 includes a computer infrastructure 12 that can perform the processes described herein. The computer infrastructure 12 includes a computing device 14 that comprises a bid placement tool 60, a bid resolution tool 70, an object definition tool 75, an enhanced rendering tool 80 and a remuneration/billing tool 90. These tools are operable to facilitate bid submissions, perform bid resolution, redefine objects for enhanced rendering, perform the enhanced rendering and perform the remuneration/billing process for enhanced rendering in a VU, e.g., the processes described herein.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution.

Further, the computing device 14 is in communication with an external I/O device/resource 28. The external I/O device/resource 28 may be keyboards, displays, pointing devices, etc. The I/O device 28 can interact with the computing device 14 or any device that enables the computing device 14 to communicate with one or more other computing devices using any type of communications link.

Additionally, in embodiments, the computing device 14 includes a storage system 22B. Storage system 22B may contain a bid database 95 for use by the computer infrastructure 12, as discussed further below.

The processor 20 executes computer program code (e.g., program control 40), which is stored in memory 22A and/or storage system 22B. While executing computer program code, the processor 20 can read and/or write data to/from memory 22A, storage system 22B, and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols. For example, advertisers may submit bids to the computer infrastructure 12 via the communications link.

In embodiments, the computer infrastructure 12 may communicate with another computer infrastructure 50, which is operating the VU. However, the invention contemplates that the computer infrastructure 12 may operate the bid placement tool 60, the bid resolution tool 70, the object definition tool 75, the enhanced rendering tool 80, the remuneration/billing tool 90, and the bid database 95 and operate the VU.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Bid Placement Tool

The bid placement tool 60 is used to conduct the bidding process. Unlike traditional virtual universe ad placement, in which two parties manually or programmatically negotiate and exchange goods or services for advertisement placement, rendering at the same quality as the surroundings and without a cost-derived order, the present invention allows advertisers to bid for enhanced rendering quality and/or enhanced rendering order using the bid placement tool 60.

In embodiments, bidding may be conducted according to a regular schedule, e.g., daily, weekly, monthly, etc., or may be conducted dynamically in real-time, wherein bids may be submitted on an ongoing basis. Moreover, the bids may last for a fixed period of time, e.g., daily, weekly, monthly, etc., such that at the end of the fixed period, an advertiser would need to re-bid in order to receive an enhanced rendering order and/or quality. Additionally, the invention may incorporate service level agreements that prevent an accepted bid from being rescinded. That is, the advertisers and the VU owner (or service provider) may agree that once a bid is accepted, that bid cannot be rescinded.

In embodiments, an advertiser may have pre-arranged agreements with, e.g., a VU manager, a service provider or client, that provide for a right of first refusal or right of bid matching. That is, for example, a preferred advertiser may have agreements that allow the advertiser, for example, to match another advertiser's higher bid for enhanced rendering quality or order. Thus, in a dynamic real-time bidding system, if another advertiser submits a new bid higher than a preferred advertiser's existing highest-ranked bid (either rendering order or quality), the preferred advertiser may be given the opportunity to, e.g., match or overbid the newly received bid.

Additionally, in embodiments, the bid placement tool 60 may include a "Buy it Now" feature. With a "Buy it Now" feature, an advertiser will receive enhanced rendering quality and/or order, while bypassing the bidding process. That is, for example, a VU owner may set a price for rendering first or for rendering with a set percentage of enhanced rendering, e.g., 75%. The bid submission tool 60 may be configured to present an advertiser with, e.g., a "Buy it Now" button for either or both of enhanced rendering order and enhanced rendering quality, along with the associated prices.

An advertiser may select the "Buy it Now" option by selecting the "Buy it Now" button presented by the bid submission tool 60 along with the associated price. If more than one advertiser selects a "Buy it Now" option for enhanced rendering order of objects, the enhanced rendering tool 80, as described further below, may render those objects such that those objects are displayed in the VU at the same time.

Figure 2:
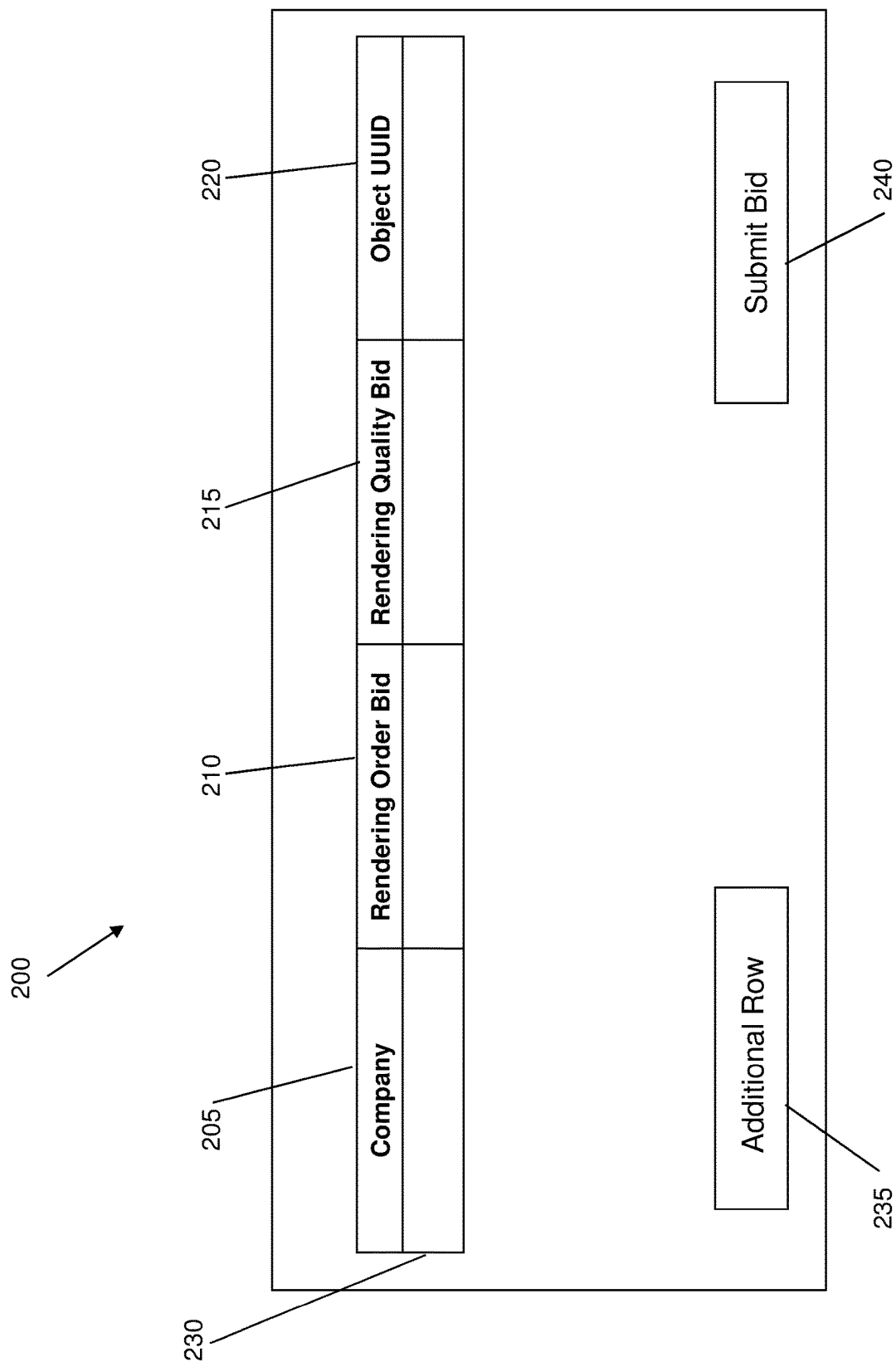
FIG. 2 shows an exemplary bid submission form according to the invention.

FIG. 2 shows an exemplary bid submission form 200 of the bid placement tool 60. It should be understood that FIG. 2 is one of many potential architectural models for the submission of bids to the bid placement tool 60, and should not limit the scope of the present invention.

The bidding process is embodiment dependant and may occur within or outside of a VU. Outside VU embodiments include the use of a web site to perform bids. Accordingly, if the bidding process occurs within a VU, the bid submission form 200 may be displayed to a user, e.g., an advertiser, within the VU. If the bidding process occurs outside of a VU, the bid submission form 200 may be displayed to an advertiser, for example, through a website portal. It should be understood, however, that the invention contemplates manual submissions of bids, as well. That is, an advertiser may submit a bid, e.g., to a VU owner, a VU operator or a service provider via conventional mail or other conventional methods.

As shown in FIG. 2, a company (e.g., ABC, DEF, etc.) wishing to bid on enhanced rendering may supply relevant data in a row 230 of the exemplary bid submission form 200. FIG. 2 has fields for "Company" 205, "Rendering Order Bid" 210, "Rendering Quality Bid" 215, and "Object UUID" 220. More specifically, the "Company" field 205 contains data describing the company placing the bid for enhanced rendering. In embodiments, the data describing the company, for example, may be a company name or a unique company identifier. The "Rendering Order Bid" field 210 contains the company's bid for the order in which to render the object identified by the supplied object UUID. The "Rendering Quality Bid" field 215 contains the company's bid for the quality with which to render the object identified by the supplied object UUID. The "Object UUID" field 220 contains the UUID of the object associated with the render order and render quality bids.

The UUID is an identifier standard used in software construction. The intent of UUIDs is to enable distributed systems to uniquely identify information without significant central coordination. Thus, anyone can create a UUID and use it to identify something with reasonable confidence that the identifier will never be unintentionally used by anyone for anything else. Information labeled with UUIDs can therefore be later combined into a single database without needing to resolve name conflicts.

The invention contemplates that a same user or entity may place bids for multiple object UUIDs for multiple advertisements (either within a same region or area of a VU, or in another region or area of a VU) during a single submission of the bid submission form 200. Thus, a user or entity may create additional rows in the bid submission form 200 as needed to enter additional bids by "clicking" an "Additional Row" button 235.

In embodiments, the bid placement tool 60 may include features that allow a bidder to restrict their bids, e.g., to specific times within the VU. That is, for example, an advertiser may only be interested in advertising during specific hours. Thus, in embodiments, the bid submission form may include one or more fields (not shown) for inputting restrictions (e.g., temporal, contextual) on the advertising. The bid resolution tool 70 and/or the enhanced rendering tool 90 may use these inputted restrictions as described further below.

Upon completing the bid submission form 200, a user may submit the bid by "clicking" the "Submit Bid" button 240. Upon receiving the bid, the bid placement tool 60 will place the bid information into a "bidding" data store, e.g., the bid database 95. In embodiments, the bid placement tool 60 may sort the objects having received bids in the bid database 95 by region or scene within a VU, or other logical ordering. That is, in order to compare the relative bids for objects within a particular scene or region of the VU, those bids (and objects) may be segmented by VU scene or region.

Bid Resolution Tool

The bid resolution tool 70 uses object metadata and information in the bidding data store, e.g., the bid database 95, to determine both the enhanced rendering order and the enhanced rendering quality for objects within a scene or region of the VU. In embodiments, the bid resolution tool 70 may sort the received bids in the bid database 95 by region or scene within a VU, or other logical ordering. That is, the invention contemplates that the received bids (and objects) may be sorted by VU scene or region by the bid placement tool 60 upon input into the bid database 95, or by the bid resolution tool 70 after being output by the bid database 95.

FIG. 3 shows an exemplary table of bids 300, received from a plurality of advertisers through the bid placement tool 60, for objects within a same region or scene of a VU. It should be understood that FIG. 3 is one of many potential architectural models for table of bids 300, and should not limit the scope of the present invention. Additionally, it should also be noted that this is a simplified example and real implementations may have several hundred bids per scene/region.

As shown in FIG. 3, companies (e.g., ABC, DEF, etc.) have bid for enhanced rendering by supplying relevant data, as shown in rows 330 of the exemplary bid table 300. The bid table 300 may have columns for "Company" 305, "Rendering Order Bid" 310, "Rendering Quality Bid" 315, and "Object UUID" 320. Additionally, the bid table 300 has a row for each object (identified by the object UUID) that has received a bid for enhanced rendering, indicating the company, the enhanced rendering order bid and the enhanced rendering quality bid for that object.

In embodiments, the bid table 300 may remain hidden to bidding advertisers. That is, the bid table 300 may be compiled from the data contained in the bid database 95 and used internally by the bid resolution tool 70 without being disclosed externally. However, the invention also contemplates an open bidding process, in which bidders may view other received bids. With this embodiment, the complete bid table may be presented to bidding advertisers. Additionally with this embodiment, in order to preserve the identity of the other advertisers, the company data may be withheld, or encrypted. Alternatively, the system may only display a unique company identification that is known to, e.g., the bid placement tool 60, but unknown to other advertisers.

Figure 4:

To determine the rendering order for objects, the bid resolution tool 70 may perform a ranking of the received bids based on the rendering order bids. In an exemplary embodiment, the bid resolution tool 70 may numerically sort rendering order bids from highest to lowest. FIG. 4 shows a bid table 400 with received bids (as shown in FIG. 3) numerically sorted from highest to lowest according to the rendering order bids. Thus, according to this exemplary embodiment, the bid resolution tool 70 may determine a rendering order for the objects as shown in FIG. 4 starting with Company STU (who has the highest rendering order bid of $5.00) and ending with Company ABC (who has the lowest rendering order bid of $1.00).

To determine the rendering quality for the objects, the bid resolution tool 70 may calculate the percentage of enhancement for an object based on its quality enhancement bid relative to the quality enhancement bid of other objects within the same region or scene. More specifically, in embodiments, the object receiving the highest rendering quality bid may be given an enhanced rendering quality attribute of 100% and objects receiving no rendering quality bids may be given an enhanced rendering quality attribute of 0%, e.g., receive the virtual universe default rendering quality.

Furthermore, for those objects that have received rendering quality bids less than the highest rendering quality bid but more than zero, they may be given an enhanced rendering quality attribute based on a comparison of their bid relative to the highest received rendering quality bid.

Thus, using the example of FIGS. 3 and 4, the bid resolution tool 70 determines that Company STU has the highest rendering quality bid, and thus, the identified object will receive an enhanced rendering quality attribute of 100%. Additionally, the bid resolution tool 70 determines Companies GHI and JKL placed no rendering quality bids, and thus, determines that those associated objects will receive the virtual universe default rendering quality.

For the other objects, the bid resolution tool 70 determines percentages of enhancement, as compared to the highest rendering quality bid. Accordingly, the object bid on by Company ABC will receive an enhanced rendering quality attribute of $3.00/$5.00=60%. The object bid on by Company MNO will receive an enhanced rendering quality attribute of $1.50/$5.00=30%. The object bid on by Company DEF will receive an enhanced rendering quality attribute of $1.29/$5.00=25.8%. The object bid on by Company ABC will receive an enhanced rendering quality attribute of $1.01/$5.00=20.2%.

It should be understood that a rendering quality enhancement of 100% may represent any amount of rendering quality enhancement. In other words, a rendering quality enhancement of 100% may not require a rendering quality of twice the virtual universe default rendering quality. Rather, a rendering quality enhancement of 100% represents the maximum amount of rendering quality enhancement as determined by, e.g., the VU owner or service provider.

Additionally, it should be understood that the described system is an example and those skilled in the art will note that many modifications are possible without deviating from the spirit of the invention. For example, the bid resolution tool 70 may account for the relative difference of the enhanced rendering order bids similar to the process for the enhanced rendering quality. That is, in addition to ranking the objects in numerical order from highest to lowest, the bid resolution tool 70 may determine the relative proportions of the other enhanced rendering order bids, as compared with the highest enhanced rendering order bid. Then, as described more below, the enhanced rendering tool 80 may delay the rendering of the objects with enhanced rendering order bids proportionally to the object with the highest enhanced rendering order bid, such that the advertisements are presented in the VU along a timeline in a proportional amount to their respective rendering order bids.

Furthermore, as described above, an advertiser may place restrictions (e.g., temporal, contextual, etc) on their bid. For example, an advertiser may restrict the advertisement, e.g., to only a period of time of a day. In implementation, the bid resolution tool 70 may recalculate the ranking of the bids during the period of time and incorporate the restricted bid into the ranking determinations during this period of time.

Object Definition Tool

The data representation of an object is stored as information, as either data or metadata. The object may be created by an object creator, e.g., a VU manager, a user, etc. In some virtual universes, larger objects are constructed of smaller objects, termed "prims" for primitive objects. These "prims" usually include boxes, prisms, spheres, cylinders, tori, tubes and/or rings. The "prims" may be rearranged, resized, rotated, twisted, tapered, dimpled and linked to create larger composite objects. A creator of such an object may then map a texture or multiple textures to the object. Texture mapping is a method of adding detail, surface texture, or color to a computer-generated graphic or 3D model. When the object is to be rendered, this information is transmitted from the VU server to the client.

Users, other than the object creator, may be allowed to alter the texture mapping of an object in the VU. According to an aspect of the invention, the object definition tool 75 is used to modify the object definition process for objects which are to be rendered at a higher quality and/or in a specific order (and which are capable of being altered). In embodiments, the object definition tool 75 may modify object metadata to include, e.g., a Boolean flag indicating if the object is to have a non-default rendering quality and/or order.

The object definition tool 75 is in communication with the bid resolution tool 70. After the bid resolution tool 70 has determined that particular objects are to receive enhanced rendering order or quality, the object definition tool 75 will modify the object definition (e.g., the data or metadata of the object) for those particular objects to indicate the enhanced rendering order and/or quality. The indication of enhanced rendering, provided by the object definition tool 75, may be used by the enhanced rendering tool 80 to identify objects for enhanced rendering, as described further below.

As described above, there may be some objects within a VU that are not subject to enhanced rendering. That is, a user or advertiser may not be allowed to alter the texture mapping of some objects in the VU. The object's data or metadata may indicate if an object is not subject to enhanced rendering order and/or quality. Thus, the object definition tool 75 may not modify the object definition of these objects. Additionally, if an advertiser places a bid for enhanced rendering order or quality for an object that is not subject to enhanced rendering order and/or quality, the bid resolution tool 70 may not include the placed bid in the bid resolution process.

Enhanced Rendering Tool

The enhanced rendering tool 80 is used to render the particular objects designated to receive enhanced rendering order or quality (by the object definition tool 75). The enhanced rendering tool 80 may supplement or augment a normal rendering engine for a virtual universe server. In embodiments, the enhanced rendering tool 80 transmits objects to clients in the order determined by the bid resolution tool 70. In addition, based on the assigned quality attribute determined by the bid resolution tool 70, the enhanced rendering tool 80 may enhance the rendering quality of the objects. The invention contemplates that several rendering quality enhancements are possible and embodiments may choose which rendering quality enhancements to implement and the degree to apply each rendering quality enhancement to the object. In embodiments, rendering quality enhancements include polygon/triangle enhancements, frame rate enhancements, and/or texture/lighting enhancements, amongst other rendering quality enhancements.

To increase rendering quality, the enhanced rendering tool 80 may perform a polygon/triangle enhancement, which increases the total number of polygons or triangles required to render the object. In 3D rendering, polygons and triangles are the primitive objects which make up complex 3D objects such as VU advertisements. Increasing the number of polygons and triangles for an advertisement increases the level of detail visible for that advertisement resulting in a "sharper" image. The enhanced rendering tool 80 may perform calculations in real time to increase the number of polygons that are required for each animated frame within a virtual universe. These calculations replace larger polygons and triangles with smaller such primitives. Increasing primitives results in a higher quality and more realistic rendering.

To increase rendering quality for an advertisement that contains animation, the enhanced rendering tool 80 may perform a frame rate enhancement. As with movies and television, smooth motion within a virtual universe is an illusion created by rapidly changing static images. Another term for these static images is rendered frames. If the number of times an advertisement is rendered per time period is increased, the smoothness of the animation would likewise be increased. A frame rate enhancement may make an animated advertisement more visually pleasing.

Additionally, to increase rendering quality, the enhanced rendering tool 80 may perform a texture/lighting enhancement, which enhances texturing mapping and lighting calculations for applicable objects. Texture mapping is the process of applying a flat texture stored in image format to a three dimensional shape. Different methods for texture mapping result in more realistic virtual objects. Several methods exist such as bump mapping, normal mapping, displacement mapping, etc. An embodiment may select a more realistic mapping technique (which may be more computationally intensive) to enhance rendering quality.

A second enhancement that may be used with or without texture enhancement is to select a more realistic lighting calculation system for object rendering. Lighting calculations are operations that modify the brightness, shading and other visual characteristics of an object by realistically simulating how light (directional and omni-directional) affects an object. Several types of lighting methods are known in the art such as ray tracing, beam tracing, cone tracing, global illumination, etc. Embodiments may choose more realistic lighting methods to enhance an object.

The enhanced rendering tool 80 renders those objects subject to enhanced rendering order and/or quality. Thus, the enhanced rendering tool 80 renders the enhanced objects in the rendering order and/or with the enhanced quality, as determined by the bid resolution tool 70 and indicated by the object definition tool 75.

The objects receiving enhanced rendering order may be rendered in a serial manner or a parallel manner. With serial rendering, the object receiving the highest-ranked rendering order bid may be rendered completely before rendering of the next-ranked object begins. With parallel rendering, objects may be rendered concurrently. For example, rendering of the object receiving the highest-ranked rendering order bid may start first, but before rendering of the highest-ranked object finishes, rendering of the next-ranked object may begin. In order to ensure that the highest-ranked object finishes rendering before the next-ranked object, the enhanced rendering tool 80 may control and adjust the start time of rendering for subsequent (lower ranked) objects to prevent a lower-ranked object from being completely rendered before a higher-ranked object.

When utilizing parallel rendering, controlling and adjusting the rendering start times may also be important when accounting for the enhanced quality bids. For example, an object may receive the highest enhanced rendering order bid and the highest enhanced quality bid. Thus, this object will be rendered first. However, because the object will also receive the highest rendering quality bid, it may take more time for this object to render. Thus, the enhanced rendering tool 80 may delay the start of rendering of the object having the next-ranked rendering order enhancement bid (which, for example, may not be subject to enhanced quality rendering, e.g., received no bid for enhanced quality rendering), such that the next-ranked object does not finish rendering before the object having the higher-ranked rendering order enhancement bid.

Billing and Remuneration System

The remuneration/billing tool 90 is used to calculate the amount to bill each advertiser. More specifically, based on the information derived from the bidding datastore, e.g., the bid database 95, the remuneration/billing tool 90 may determine the amount to bill each advertiser. That is, the remuneration/billing tool 90 can determine which advertisements were presented in the VU and the prices of those advertisements based upon the bidding process. Thus, the remuneration/billing tool 90 may determine how much an advertiser may owe for a placed advertisement.

The remuneration/billing tool 90 may determine the amount to bill each advertiser on a regular basis (e.g., daily, weekly, monthly, etc.) Moreover, in embodiments, an advertiser may query the remuneration/billing tool 90, e.g., regularly or at any time to determine an amount owed. Known methods may be used for electronic billing of advertisers. Revenue is generated, e.g., for the VU or those running this service for the VU, by the bid money.

In embodiments, billing information is associated with the company prior to bid submission. That is, prior to submitting a bid with the bid placement tool 60, an advertiser may be required to register with, e.g., the VU owner, the VU manager, or a service provider and submit relevant billing information. In additional embodiments, billing information may be associated with the company (e.g., the advertiser) during bid submission. That is, for example, the bid submission form 200 may include one or more fields (not shown) for entry of relevant billing information.

Additional Embodiments

Numerous modifications are possible without deviating from the spirit of this invention. For example some embodiments may do all object rendering order enhancement and rendering quality enhancement on the virtual universe client rather than the server, by transmitting metadata to the client with the scene description.

Furthermore, for example, a VU owner, VU manager or a service provider may reward loyal and/or effective advertisers with enhanced rendering order or quality without those advertisers being involved in a bidding process. That is, for example, the VU owner, VU manager or a service provider may grant enhanced rendering order or quality to advertisers for no charge. The VU owner, VU manager or a service provider may determine loyal and/or effective advertisers by utilizing data in the bid database 95. The bid database 95 may maintain the records of all received bids, and thus, e.g., a VU owner, may determine if an advertiser is a loyal advertiser.

Additionally, by reviewing the assets of users in the VU, a VU owner, VU manager or service provider may determine the effectiveness of an advertiser's advertising. That is, through tracking the viewing of advertisements by a user, and subsequently monitoring the user's assets, e.g., a VU owner, VU operator or a service provider may determine if the user took action (e.g., purchased a product) based on an advertisement, within a period of time of viewing the advertisement. Thus, e.g., a VU owner, VU operator or a service provider may determine which advertisers are presenting effective advertisements. Accordingly, in embodiments, the VU owner, VU operator or a service provider may reward those advertisers with enhancements at no charge and without a bidding process.

The invention contemplates potential utility beyond advertising, allowing selective rendering options in order to convey information more effectively by a range of users, including educators, homeowners, stores, governments, artists, psychologists, ergonomics and human-factors experts, and administrators of regions and buildings. For example, a store may want to display certain items before others. A building administrator may want warning signs to be displayed before other items. Although not technically considered as "advertisements," this invention is intended to cover such usage. This may also help with accessibility, for example accessibility by the visually or cognitively impaired. The invention also provides the ability to render certain avatars before others. This may have particular utility when the VU is running slowly and/or having difficulty rendering many avatars within a scene. Users may be willing to pay to have their avatars rendered before other avatars, or other objects in the environment, in social or business settings. Users may also be willing to pay to have buildings, such as homes or business locations, rendered before other buildings or other objects in the environment.

Additionally, while the invention has been described using the bid placement tool 60, the bid resolution tool 70, the object definition tool 75, the enhanced rendering tool 80 and the remuneration/billing tool 90 to facilitate bid submissions, perform bid resolution, redefine objects for enhanced rendering, perform the enhanced rendering and perform the remuneration/billing process for enhanced rendering, the invention contemplates that any of the operations performed by the bid placement tool 60, the bid resolution tool 70, the object definition tool 75, the enhanced rendering tool 80 and the remuneration/billing tool 90 may be performed manually by a user (e.g., a VU manager, an advertiser or a service provider). For example, a user may: facilitate bid submissions; perform bid resolution; redefine objects for enhanced rendering; perform the enhanced rendering; and/or perform the remuneration/billing process.

Flow Diagram

The steps of the flow diagram described herein may be implemented in the environment of FIG. 1. The flow diagram may equally represent a high-level block diagram of the invention. The steps of the flow diagram may be implemented and executed from either a server, in a client server relationship, or they may run on a user workstation with operative information conveyed to the user workstation. Additionally, the invention can take the form of an entirely hardware embodiment, an entirely software embodiment or an embodiment containing both hardware and software elements. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 5:
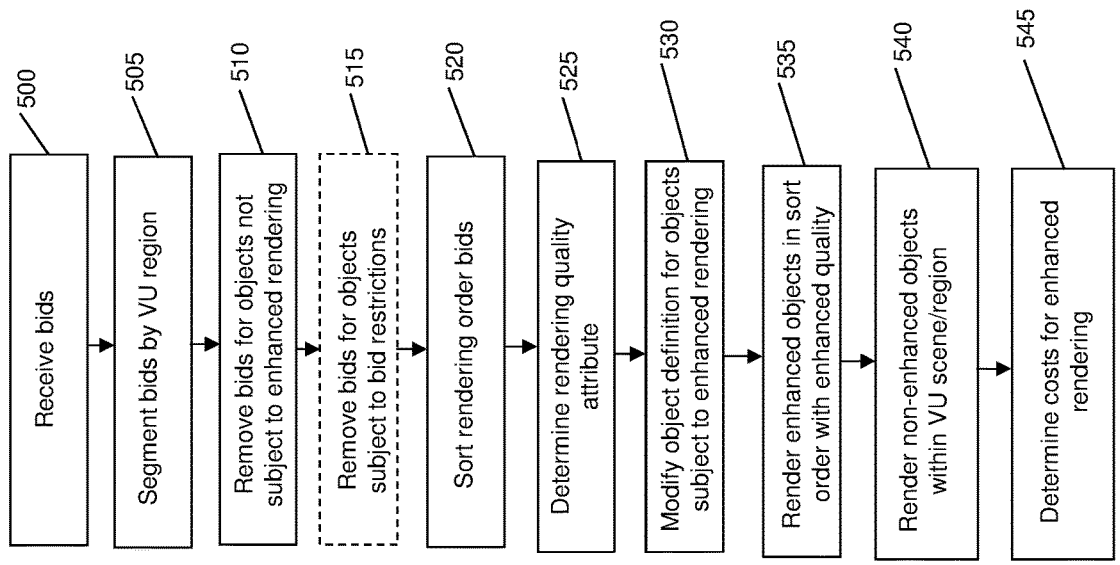
FIG. 5 is an exemplary flow chart of steps for implementing aspects of the invention.

FIG. 5 shows an exemplary flow chart for performing steps of the invention. At step 500, via the bid placement tool, bids for enhanced rendering order or quality via the bid placement tool may be placed. Additionally, the bid placement tool may store the placed bids in the bid database. At step 505, the bid placement tool or the bid resolution tool segments the bids by VU region. At step 510, the bid resolution tool removes bids, e.g., from the bid database or the bid resolution analysis for objects that are not subject to enhanced rendering order and/or enhanced rendering quality. At step 515, the bid resolution tool may remove bids for objects subject to bid restrictions. In embodiments, this step may include the bid resolution tool determining properties of the VU (e.g., time of day). In embodiments, step 515 may be an optional step, indicated by the hidden lines. At step 520, the bid resolution tool numerically sorts the rendering order bids for a scene or region, e.g., from highest to lowest.

At step 525, the bid resolution tool determines a rendering quality attribute for all applicable objects (e.g., those objects subject to enhanced quality rendering, which have received an enhanced quality bid). As described above, the bid resolution tool may determine rendering quality attributes based on bid relativity to other objects within a scene or region. That is, an object with a highest rendering quality bid may receive a 100% quality enhancement and the other objects receive a proportional quality enhancement compared to the highest rendering quality bid.

At step 530, the object definition tool modifies the object definitions for those objects that have been determined to receive enhanced rendering order or quality. In embodiments, the object definition tool may modify the object's data or metadata to indicate the enhanced rendering order or quality. At step 535, the enhanced rendering tool renders the objects having enhanced rendering order and/or quality in the order and with the quality as determined by the bid resolution tool. At step 540, the non-enhanced objects within the view/scene are rendered. At step 545, the remuneration/billing tool may determine an advertiser's costs for placing the advertisement for remuneration/billing purposes.

It should be understood, that while the steps have been described as occurring in a particular order, the invention contemplates that the steps may be performed in other orders. For example, step 510 may occur after step 515. Furthermore, the invention contemplates that, in embodiments, steps may be implied or omitted while still remaining true to this invention.

While the invention has been described in terms of embodiments, those skilled in the art will recognize that the invention can be practiced with modifications and in the spirit and scope of the appended claims.

What is claimed is:

1. A method implemented in a computer infrastructure having computer executable code, comprising:
   determining that a rendering of a plurality of avatars within a virtual universe (VU) is running slower than a predetermined time within a scene of the VU;
   rendering one of the plurality of avatars before other avatars of the plurality of avatars, in response to a user associated with the one of the avatars providing remuneration;
   displaying a buy it now option corresponding with a first object in the VU to be rendered at a predetermined percentage of an enhanced rendering quality before any other objects are rendered;
   rendering the first object in the VU to the predetermined percentage of the enhanced rendering quality, in response to a selection of the buy it now option, before any other objects are rendered;
   bypassing a bidding process in response to the selection of the buy it now option;
   in response to the determination that an advertiser has not selected the buy it now option:
      ensuring that the first object is rendered in the VU before a second object is rendered in the VU by accounting for a rendering time of the first object and adjusting when the rendering of the second object will begin;
      receiving two or more bids for an enhanced rendering order of the first and second objects in a same region or scene of the VU, wherein the first object has a higher bid value than a bid value of the second object;
      rendering the first and second objects in the VU with the enhanced rendering order based on a bid resolution for the enhanced rendering order such that a rendering start time of the first object with a higher bid value occurs prior to a rendering start time of the second object with a lower bid value;
      removing at least one bid from a bid database for the bid resolution which is not subject to the enhanced rendering order;
   providing the enhanced rendering quality to the first object and the second object based on the bid resolution for the enhanced rendering quality;
   determining whether the user has purchased a product based on the first and second object being rendered in the VU; and
   providing the enhanced rendering order corresponding with the product purchased by the user in the VU, in response to determining that the user has purchased the product,
   wherein the rendering start time for the first object with the higher bid value for the enhanced rendering order and the rendering start time for the second object with the lower bid value for the enhanced rendering order are adjusted to account for a delay in rendering such that the first object of the two or more objects with the higher bid value for the enhanced rendering order is completely rendered before the second object of the two or more objects with a lower bid value for the enhanced rendering order is completely rendered.

2. The method of claim 1, wherein the receiving the two or more bids for the enhanced rendering order and the enhanced rendering quality further comprises receiving for each bid:
   an entity identifier which comprises a company name;
   a rendering order bid which comprises an order in which to render an object;
   a rendering quality bid which comprises a quality in which to render the object; and
   an object UUID which comprises a universally unique identifier (UUID) of the object associated with the order in which to render the object and the quality in which to render the object.

3. The method of claim 2, wherein the receiving the two or more bids for the enhanced rendering order further comprises receiving one or more bid restrictions, wherein the one or more bid restrictions comprise:
   a VU condition restriction;
   a VU location restriction which comprises a predetermined location for an advertisement; and
   a VU temporal restriction which comprises a predetermined period of time for the advertisement.

4. The method of claim 1, further comprising storing the received two or more bids for the enhanced rendering order and the enhanced rendering quality in the bid database, the received two or more bids for the enhanced rendering order of the first and second objects in the same region or scene of the VU occurs prior to rendering the first and second objects in the VU, and the provided enhanced rendered quality to the first object and the second object based on the bid resolution for the enhanced rendering quality is provided such that the first object and second object are rendered with a maximum rendering quality, a percentage of the maximum rendering quality, or a default rendering quality.

5. The method of claim 1, further comprising modifying an object definition of the two or more objects to indicate the enhanced rendering order and the enhanced rendering quality.

6. The method of claim 1, wherein:
   the enhanced rendering quality comprises:
      a polygon/triangle enhancement which includes increasing a total number of polygons and triangles to render the first object and the second object;
      a frame rate enhancement which includes increasing a number of times per a predetermined time period that the first object and the second object are rendered; and
      a texture/lighting enhancement which includes performing beam tracing of the first object and the second object.

7. The method of claim 1, wherein the rendering of the two or more objects with the enhanced rendering order further comprises at least one of serial rendering and parallel rendering.

8. The method of claim 1, further comprising determining a payment amount for the rendering of the two or more objects in the VU with the enhanced rendering quality and the enhanced rendering order based on the bid resolution for the enhanced rendering quality and the enhanced rendering order.

9. The method of claim 1, wherein the receiving the two or more bids for the enhanced rendering quality and the enhanced rendering order is at least one of:
   ongoing;
   according to a pre-determined schedule; and
   for a predetermined time period.

10. The method of claim 1, wherein the receiving the two or more bids for the enhanced rendering quality and the enhanced rendering order occurs at least one of:
    within the VU; and
    outside of the VU.

11. The method of claim 1, wherein the two or more objects are at least one of: an avatar, a sign, a building, an advertisement, and a graphical depiction of an item for sale.

12. The method of claim 1, wherein a service provider at least one of creates, maintains, deploys and supports the computer infrastructure that performs the steps of claim 1.

13. The method of claim 1, wherein steps of claim 4 are provided by a service provider on a subscription, advertising, and/or fee basis.

14. The method of claim 1, wherein the bid resolution comprises:
    determining a bid value for each of the two or more bids;
    determining a highest bid value of the bid values for the two or more bids; and
    assigning the highest bid value a complete rendering attribute that corresponds to a maximum rendering quality.

15. The method of claim 14, wherein the bid resolution further comprises:
    assigning all bid values for the two or more bids that are less than the highest bid value and greater than zero with a percentage rendering attribute based on a percentage of the highest bide value that correspond to a rendering quality equal to a percentage of the maximum rendering quality; and
    assigning all bid values for the two or more bids that are zero with a default rendering attribute that corresponds to a default rendering quality for the VU.

16. The method of claim 1, further comprising providing the advertiser with the buy it now option for enhanced rendering order and the enhanced rendering quality.

17. The method of claim 1, further comprising dynamically conducting the bidding process in real-time.

18. The method of claim 17, wherein an advertiser corresponding to the bid value of the second user is given an option to overbid another advertiser corresponding to the higher bid value of the first object in response to the bidding process being dynamically conducted in real-time.

19. The method of claim 18, further comprising sorting and segmenting the first object and the second object in the bid database by a VU scene.

20. The method of claim 1, wherein the bid database includes encrypted company data, the two or more bids are numerically sorted from highest to lowest according to rendering order bids, and the first and second objects in the VU have a lighting enhancement which includes ray tracing and global illumination.

* * * * *